United States Patent

Jacobs

[11] 3,990,403
[45] Nov. 9, 1976

[54] CERAMIC APPARATUS FOR DISPENSING LIQUID SUBSTANCES TO FLYING CREATURES

[76] Inventor: Janina Jacobs, 445 Cambridge Ave., Palo Alto, Calif. 94306

[22] Filed: Mar. 12, 1975

[21] Appl. No.: 557,501

[52] U.S. Cl. ............................ 119/72.5; 222/420
[51] Int. Cl.² .......................................... A01K 7/00
[58] Field of Search ............... 222/181, 420–422, 222/562; 119/71, 72, 72.5, 74, 77, 51, 51.5; D30/13–16; 29/451; 215/1 R, 31 R; 427/230

[56] References Cited
UNITED STATES PATENTS

| | | | |
|---|---|---|---|
| 1,650,028 | 11/1927 | Morrison | 215/1 R |
| 2,308,325 | 1/1943 | Binnington | 215/31 |
| 3,125,069 | 3/1964 | Fowler | 119/51 |
| 3,320,929 | 5/1967 | Kay | 119/71 |
| 3,589,338 | 6/1971 | Lovitz | 119/72.5 |
| 3,769,070 | 10/1973 | Schilt | 427/230 |
| D216,430 | 1/1970 | Brown | D30/14 |
| D217,773 | 6/1968 | Brown | D30/14 |

*Primary Examiner*—Robert B. Reeves
*Assistant Examiner*—H. Grant Skaggs
*Attorney, Agent, or Firm*—Paul Hentzel

[57] ABSTRACT

An inverted ceramic container dispenses nutritional liquids through a short glass tube to hovering hummingbirds. The tube extends into the interior of the dispenser through a resilient stopper which engages a refill aperture in the dispenser. Various insulative properties of the ceramic dispenser protect the liquids from heat and light damage and loss. The rough unglazed inside surface of the dispenser neck establishes a tenacious seal with the resilient stopper. The unglazed exterior surface of the neck prevents dew and rain moisture from flowing down the outside surface of the dispenser to the tip of the glass tube. This surface moisture is objectionable because it wets the tip of the glass tube causing the nutritional liquid to drip out. The plastic nature of moist unfired clay readily permits the formation support loop integral with the ceramic body.

5 Claims, 1 Drawing Figure

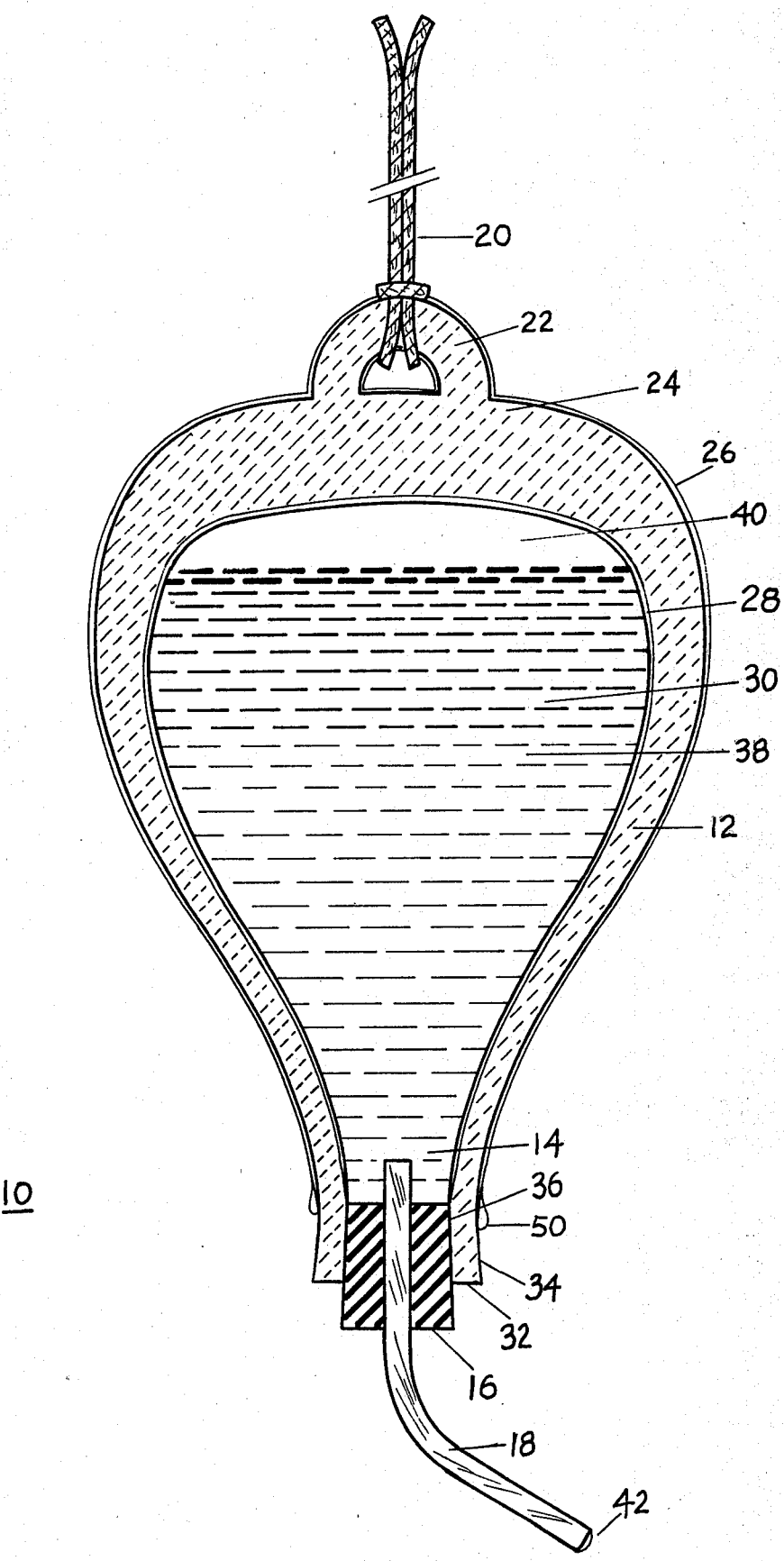

CERAMIC APPARATUS FOR DISPENSING LIQUID SUBSTANCES TO FLYING CREATURES

FIELD OF THE INVENTION

This invention relates to liquid dispensers for birds, and more particularly to inverted ceramic dispensers.

DISCUSSION OF THE PRIOR ART

Heretofore liquid dispensers have been fabricated primarily out of glass and plastic. The thinness of the plastic and the insulative properties of the glass contributed to spoilage of the dispensed liquid. Sunlight causes honey and sugar mixtures to ferment and become sufficiently toxic to kill hummingbirds (Horticulture, February 1975, page 18). To avoid this problem zoological gardens feed their hummingbirds in the evening to avoid spoilage under the hot sun ("Hummingbirds", by W. Scheithauer, page 147, Thomas and Crouell Co.). In addition, the daily temperature cycle caused unnecessary loss of liquid through thermal expansion and contraction of the liquid.

SUMMARY OF THE INVENTION

It is therefore an object of this invention to provide:
a ceramic liquid dispenser for birds with properties favorable for minimizing spoilage and loss through heating and exposure;
an integral ceramic liquid dispenser for birds which forms an improved seal around a resilient stopper; and
a ceramic liquid dispenser for birds which minimizes loss of the liquid through dripping.

These an other objects are accomplished by providing a hollow opaque ceramic body with a downwardly extending neck terminating in an aperture. A resilient stopper engages the aperture with a hollow feeder tube extending through the stopper and laterally away from the body. Liquid within the hollow body flows into the feeder tube to the external tip thereof where flying creatures may obtain the liquid in small portions.

DETAILED DESCRIPTION OF THE PREFERRED EMBODIMENTS

These and other advantages of the ceramic dispenser and the meritorious features of the ceramic material will become apparent from the following detailed description and drawing showing a ceramic dispenser in section.

Referring to the drawing, there is shown a liquid dispenser 10 formed by a hollow ceramic body 12, with an aperture or mouth 14, a resilient stopper 16 inserted in mouth 14, and an obtuse feeder tube 18 extending through stopper 16. Ceramic body 12 is suspended by a thong 20 in an inverted position with mouth 14 and stopper 16 downward. Thong 20 engages a support 22 integrally formed in body 12. Body 12 preferably has an esthetic outside glaze 26 which facilitates cleaning body 12, and an inside glaze 28 to permit rinsing of a cavity 30 formed by the hollow interior of body 12. The glazes 26 and 28 extend over the entire surface of body 12, outside and inside, except proximate mouth 12. Preferably colored outside glaze 26 does not cover an annular end face 32 and a small vertical margin 34 adjacent to face 32 around the outside surface of body 12; and preferably inside glaze 28 does not cover the neck portion 36 of cavity 30 where stopper 16 engages the inside surface of body 12.

In operation, cavity 30 holds a liquid 38 to be dispenses. Liquid 38 may be a sugar-water syrup or other liquid nutrient (Hummingbirds, Water Scheithauer, pages 145–7) and is preferably bright in color. It is believed that color contrast of the liquid seen in tube 18 and the container itself attracts to drink from dispenser 10. Liquid 38 occupies the lower portion of cavity 30 and feeder tube 18 leaving an air pocket 40 in the upper end of cavity 30. A liquid bulge 42 or partial droplet forms at the exposed end of tube 18 delicately maintained in place by the surface tension of liquid 38. Flying creatures such as hummingbirds approach tube 18 and disturb bulge 42 with their beaks causing the release of a drop of liquid 38. As bulge 42 forms a completed drop, or is otherwise removed from tube 18, a small quantity of air enters tube 18 and bubbles up toward body 12. These bubbles accumulate in air pocket 40 displacing a corresponding volume of liquid 38 which enters tube 18 to replace the consumed or lost liquid. The ability of liquid 38 to bubble and the formation of bulge 42 are a function of the surface tension and viscosity of liquid 38 and the extent to which air pressure in pocket 40 exceeds the fluid head created by the depth of liquid 38.

In the preferred embodiment:
Ceramic body 12 is formed of commercial stoneware clay approximately one quarter inch thick;
resilient stopper 16 is a rubber cork size three;
feeder tube is ¼ inch glass tube, about 4 inches long with a bend of about 45°;
outside glaze 26 is about 20 mils in thickness and inside glaze 28 is about 20 mils in thickness;
neck portion 36 has an end face 32 about three-sixteenth inches across, and vertical margin 34 is about one-fourth inch high;
unglazed neck 36 extends about 1.5 inches into cavity 30; and
liquid 38 is four parts water and one part sugar supplemented with vitamins and protein during the winter months.

Body 12 may be fabricated by conventional clay throwing techniques on a potter's wheel or by conventional molding techniques. If desired, porcelain or earthenware clays must be used. Preferably inside glaze 28 is a non-toxic, lead-free glaze, imprevious to acids to avoid contaminating long standing liquids. Also it is preferred that inside glaze 28 be a vitreous, porcelain type to facilitate cleaning cavity 30 of any spoiled liquid 38. Outside glaze 26 is preferably handsomely colored to provide a unique esthetic appearance.

Ceramic dispensers have many advantageous characteristics over the prior art glass or plastic material which uniquely cooperate with the liquid dispenser function. The following superior properties of the ceramic hummingbird feeder are particularly noted.

Ceramic dispensers offer greater thermal insulation than commercial glasses which minimizes solar heating effects. Bird feeders of this type are commonly hung outside near a patio or garden and typically receive direct sunlight for at least a portion of each day which causes the liquid therein to increase in temperature. For each 10° increase in temperature chemical reactions in liquid 38, such as spoilage or fermentation, increase by a factor of two. A 20° temperature increase quadruples the fermentation rate. Further, as body 12 and liquid 38 get warmer, the air in pocket 40 expands a proportional amount displacing a column of liquid 38 out through tube 18. In addition, liquid 38 has a lower vapor pressure as its temperature increases causing evaporation into cavity 30 to increase contributing to the increasing volume of cavity 40. The day-night thermal cycle causes a daily loss of liquid 38. Both the lost volume and the spoilage are a function of solar heating of dispesner 10. Reduction in solar heating reduces both causes of lost volume directly, and retards spoilage exponentially. The greater insulative properties of ceramic body 12 reduces internal heat flow from the heated surface to liquid 38 inside. Less of the sun's energy passes into liquid 38. The thick sides and base of ceramic body 12 permits absorbtion of more heat with less change in temperature.

The thermal insulative property of ceramic body 12 aids in preventing waste of liquid 36. In addition, the smooth highly pigmented surface of outside glaze 26 reflects incident light reducing the solar heat intake. Prior art glass materials do not have high surface pigmentation to prevent penetration of light energy. The pigmentation in glass, if any, is generally distributed internally permitting the light to partially penetrate the glass. In addition, ceramic dispensers thrown on a potter's wheel typically have a thick base 24 which enhances these insulative properties. Thick base 24 forms the top of dispenser 10 and receives the brunt of the sun's energy. The bulk of base 24 adds to the heat flow retardation, and forms a reservoir of material slow to change in temperature. Molded dispensers may be designed to include a generous base portion.

In addition, ceramic body 12 is opaque and shields liquid 38 from solar ultraviolet radiation which otherwise would oxidize the scarlet pigment in liquid 38. Nutrient solutions contained in transparent prior art glass dispensers fade when exposed to direct sunlight. It is commonly understood that hummingbirds are attracted by colors that stand out from the background, in which case the opaque and colorful characteristics of ceramic body 12 is beneficial. Only the small portion of liquid 38 in tube 18 is exposed to sunlight. The greater portion of liquid 38 remains in protected cavity 30 and retains its original color.

Unglazed tapered neck of ceramic body 12 cooperates with stopper 16 to form a more tenacious engagement and a superior seal. Ceramic material after firing has a rough or granular surface similar to the ground glass engaging surfaces of reagent bottles. The tiny irregularities on neck surface 36 bite into the surface of stopper 16 a minute amount. The collective effect these engagements produce is a substantial resistance to lateral movement between neck surface 36 and stopper 16. The prior art glass dispensers were smooth and relied solely on the radial expansive force of the stopper compressed into the mouth of the dispenser to maintain the stopper in position. The rough surface of ceramic neck 36 provides an additional retaining factor to supplement this conventional expansion force.

The expansive engagement force deteriorates proportionaly as stopper 18 is slowly and incrementally advanced out of mouth 14 through blows delivered by feeding birds, banging from the wind, the day-night thermal cycle, and other minor but repetitious disturbances which cause stopper 16 to creep down neck 36. The downward displacement of stopper 16 is slightly but perpetually encouraged by the fluid head of liquid 38. The expansive force gradually decreases because stopper 18 expands, or decompresses as it moves downward to fill the widening diameter of mouth 14.

The bite resistance to movement not only opposes the above downward creep, but also is not subject to the same deterioration as stopper 16 regains its original dimensions. Rough neck surface 26 retains its full bite as long as stopper 16 has sufficient expansion left to push the stopper surface into the rough ceramic surface. Alternatively stated, the expansive engagement diminishes proportionately to the decompression of stopper 16, but the bite resistance to movement forces remain fully effective until the expansive forces are no longer sufficient to urge the stopper into a biting relationship. The bite effect is similar to a lockwasher — it opposes motion and the bite maintains a constant antimotion force even if the opposed motion occurs. The motion-opposing force continues until the lockwasher is no longer in compression. The bite and lockwasher effects are particularly effective against seal deterioration due to impact to maintain the seal between stopper 16 and unglazed neck region 36. This seal must be maintained air-tight and waterproof or air will leak in and liquid 38 will be slowly lost through leakage.

The presence of unglzed vertical margin 34 and unglazed end face 32 also prevents loss of liquid 38. Each morning dew collects on the exterior surface of dispenser 10 which has cooled during the preceding night. The dew gathers in drops and runs down outside glaze 26. Glaze 26 is by nature very smooth and provides an excellent wetting surface with very little opposition to motion. The dew accumulates along the upper boundary of unglazed margin 34 as shown at 50. Margin 34 is rough, non-wetting surface. The surface tension of collected dew 50 prevents the dew from entering rough unglazed margin 34. Hopefully the dew is not excessive and evaporates without crossing margin 34. If body 12 were glazed across margin 34 and face 32, the dew would freely run downward past stopper 16 and out to the tip of feeder tube 18 where it would interfere with the delicate surface tension forces which maintain liquid bulge 42 at the tip of feeder tube 18. If the dew were permitted to accumulate at the tip of feeder 18, it would wet the glass proximate bulge 42 causing the liquid in tube 18 to rapidly drip out. The liquid would then be wasted on the patio floor where it forms sticky spot marks attracting flies and ants.

Heavy dew or rain collecting along the upper boundary of vertical margin 34 may overrun the margin barrier before being diminished by evaporation. The accumulated water is periodically released at the moment the weight of the water overcomes the retaining surface tension, causing the water to surge down margin 34 and drip off the lower edge thereof to the ground below. The rapidly moving water surge fails to negotiate the sharp angle between vertical margin 34 and horizontal end face 32. The angle is made even more acute by the outward flare of margin 34 caused by tapered neck 36. Unglazed margin 34 and face 32 prevent external wetting of the tip of tube 18 and priming of bulge 42.

Unfired ceramic material is in a plastic state which facilitates forming integral support 22. Support 22 may be fused to exterior surface of body 12 at room temperature by pushing the two plastic surfaces together. A ceramic fillet may easily be formed along the handlebody interface for improving both its strength and appearance. Prior art glass and plastic substances require an elevated temperature or special chemicals for such fusion to take place. Mechanical connecting devices such as bolts or screws are unsuitable because they require a hole through one or both of the members to be joined. Any hole through body 12 offers a potential air leak into air pocket 40 which must be maintained at a partial vacuum to hold up liquid 38. Further, prior art springbands which retain the dispenser body may slowly creep upwards and eventually lose the dispenser altogether. The fusion of prefired body 12 to support 22 forming an integral-permanent support may be done at room temperature, without additional chemicals, and without injury to the hermetic seal of body 12 around pocket 40 and liquid 38.

It will be apparent to those skilled in the art that the objects of the ceramic dispenser have been accomplished through the favorable thermal, physical, and surface texture properties of ceramic body 12. Various changes may be made in the hereinbefore described dispenser without departing from the scope of the invention. For example, body 12 may be mounted on the side of a structure by an extending device such as a nail. Body 12 may be provided with a flat surface portion which engages a corresponding flat surface of a wall. Heat flow across the flat surfaces reduces the daily thermal circle of body 12.

I claim as my invention:

1. A device for dispensing liquid substances to flying creatures, comprising:
   an opaque ceramic body member formed of earthenware, stoneware or porcelain having an inner cavity portion adapted to contain the liquid substance with a downwardly extending ceramic neck portion integrally formed in the lower portion of the ceramic body portion and defining an aperture therein to provide fluid access from the cavity portion through the body member, the external surface of the body member having a glaze thereover except for a continuous unglazed band proximate the aperture extending around the inside and the outside of the neck portion;
   a resilient member contoured to fit into the aperture and dimensioned to compressively engage unglazed band around the inner surface thereof;
   an elongated hollow feeder member extending through the resilient member providing fluid communication between the external tip of the feeder member and the cavity; and
   support means formed integrally with the body member for suspending the members with the external tip of the feeder member position below the level of at least a substantial portion of the liquid substance adapted to be contained within the cavity portion for allowing the feeder member to fill with the liquid substance.

2. The device of claim 1, wherein the neck portion terminates in a continuous unglazed vertical margin portion extending around the aperture.

3. The device of claim 2, wherein the external tip of the feeder member extends laterally away from the body member;
   the resilient member is a rubber stopper with a cylindrical channel therethrough; and
   the feeder member is a cylindrical hollow glass tube extending into the channel in fluid communication with the cavity.

4. The device of claim 3, wherein the support means is a ceramic loop integrally formed proximate the top of the ceramic body member.

5. The device of claim 3, wherein the support means is a generally flat vertical portion integrally formed along one side of the body member and having a mounting aperture therethrough.

* * * * *